United States Patent [19]

Fuelling, Jr. et al.

[11] 4,281,505
[45] Aug. 4, 1981

[54] FILAMENT MOWER WITH FILAMENT ADVANCING MECHANISM

[75] Inventors: William Fuelling, Jr., Galesburg; Carl E. Seyerle, Abingdon, both of Ill.

[73] Assignee: Outboard Marine Corporation, Waukegan, Ill.

[21] Appl. No.: 157,469

[22] Filed: Jun. 9, 1980

[51] Int. Cl.³ .................. A01D 55/18; A01G 3/06
[52] U.S. Cl. .......................... 56/12.7; 30/276
[58] Field of Search .................. 56/12.7, 255, 295; 30/276, 347; 242/54 R, 128

[56] References Cited

U.S. PATENT DOCUMENTS

| | | | |
|---|---|---|---|
| 4,033,098 | 7/1977 | Green | 56/17.5 |
| 4,077,191 | 3/1978 | Pittinger et al. | 56/12.7 |
| 4,097,991 | 7/1978 | Proulx | 30/276 |
| 4,134,204 | 1/1979 | Perdue | 30/276 |
| 4,162,575 | 7/1979 | Ballas | 30/276 |
| 4,172,322 | 10/1979 | Ballas | 30/276 |
| 4,189,830 | 2/1980 | Pittinger | 30/276 |
| 4,203,212 | 5/1980 | Proulx | 56/12.7 |
| 4,211,005 | 7/1980 | Woods | 30/276 |

Primary Examiner—Robert A. Hafer
Attorney, Agent, or Firm—Michael, Best & Friedrich

[57] ABSTRACT

Disclosed herein is a filament mower comprising a wheel supported housing having an upper deck, a prime mover mounted on the upper deck and including an output shaft extending through the upper deck of the said housing, a string trimmer head fixed to the output shaft within the housing and including a spool carried on the output shaft for rotary movement relative thereto, a spool cover carried on the output shaft for common rotation therewith, one of the spool and the spool cover being movable axially of the output shaft between an upper position and a lower position, means for limiting movement outwardly of the output shaft of the other of the spool and the spool cover, means for biasing the spool and the spool cover away from each other, and interengaging lugs on spool and on the spool cover for interengaging the spool cover and the spool for common rotation when the one of the spool cover and the spool is in the upper position and in the lower position and for permitting relative rotation between the spool and the spool cover during movement of the one of the spool cover and the spool between the upper and lower positions, and means on the housing for displacing the one of the spool and the spool cover toward the other of the spool and the spool cover against the action of the biasing means.

17 Claims, 7 Drawing Figures

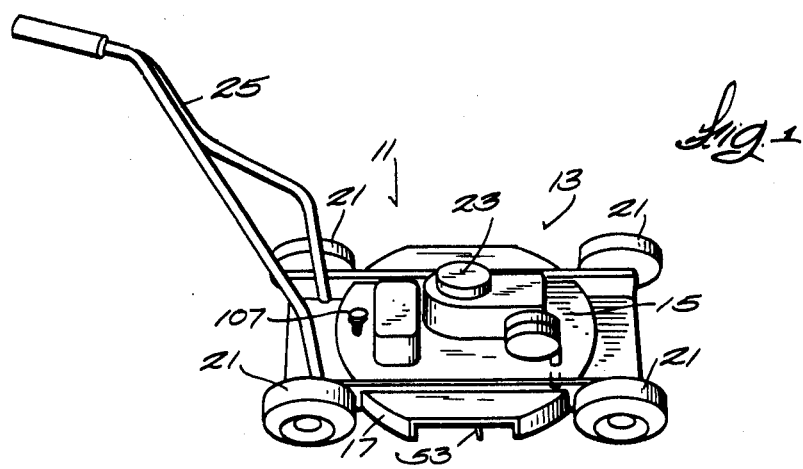
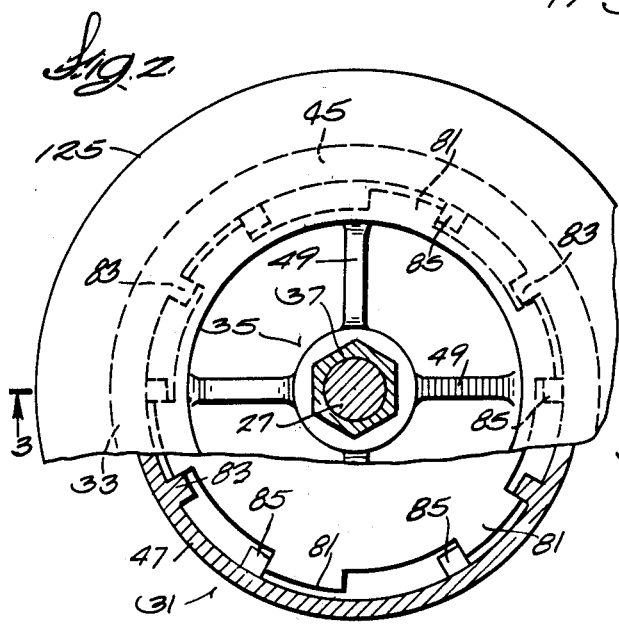
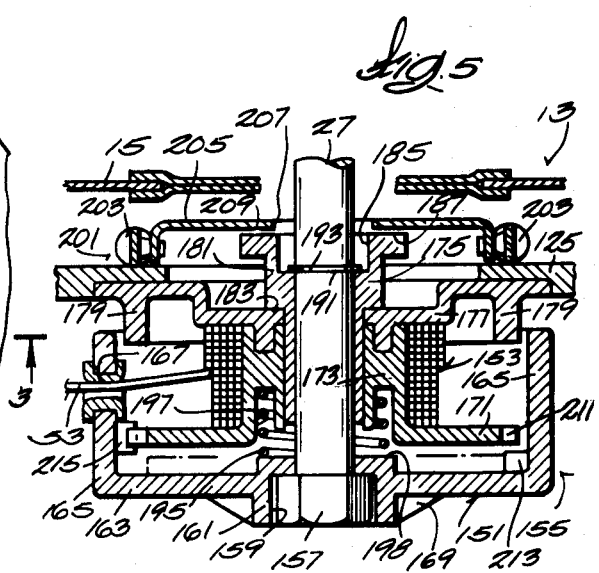
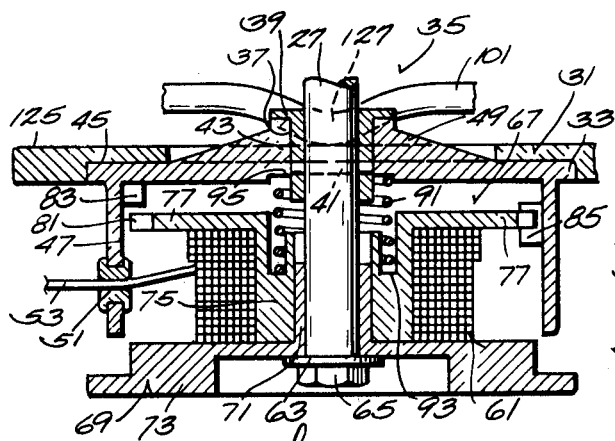
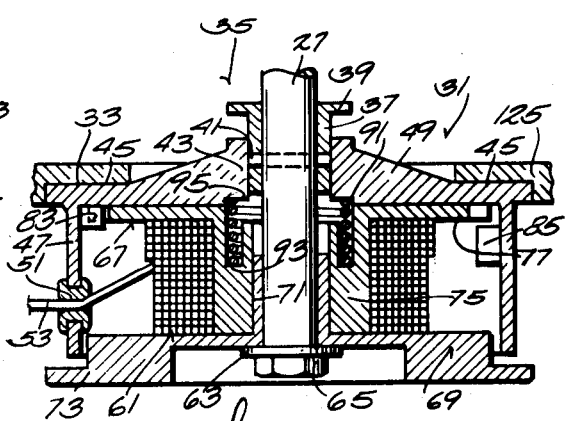

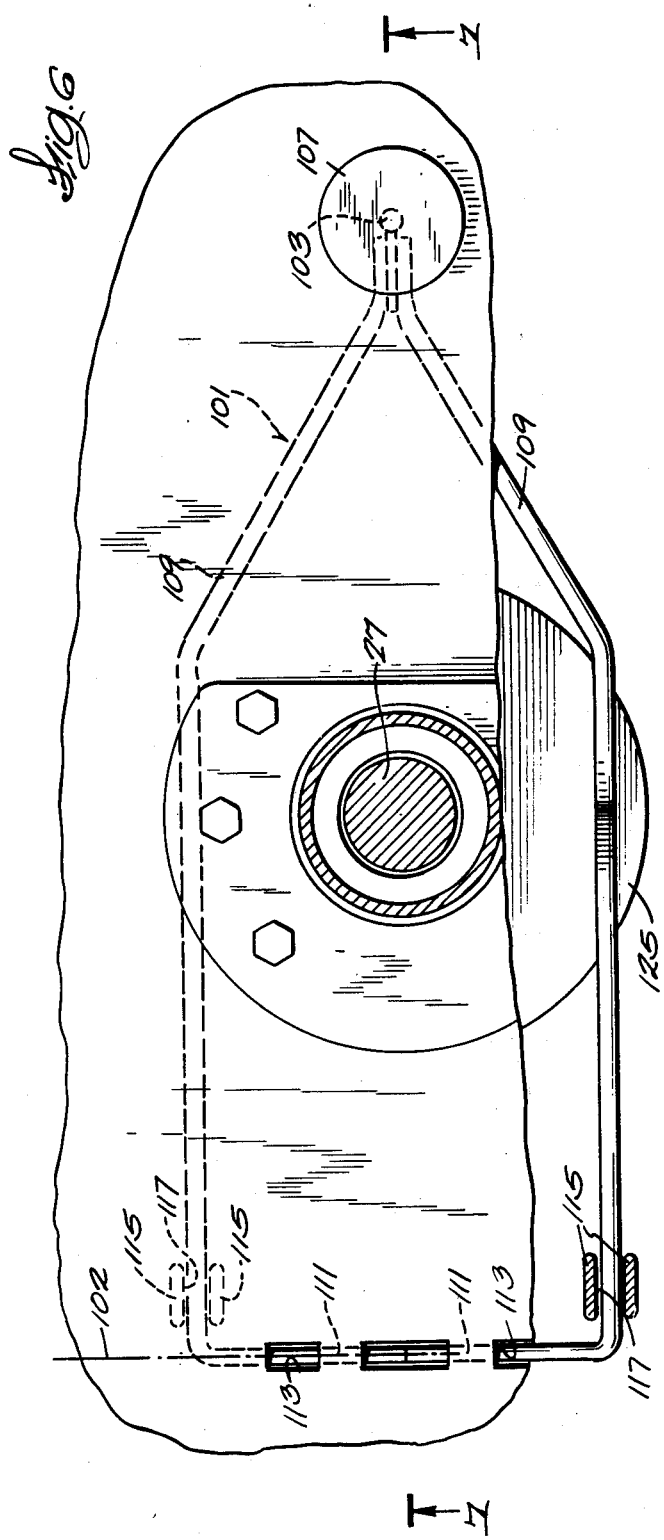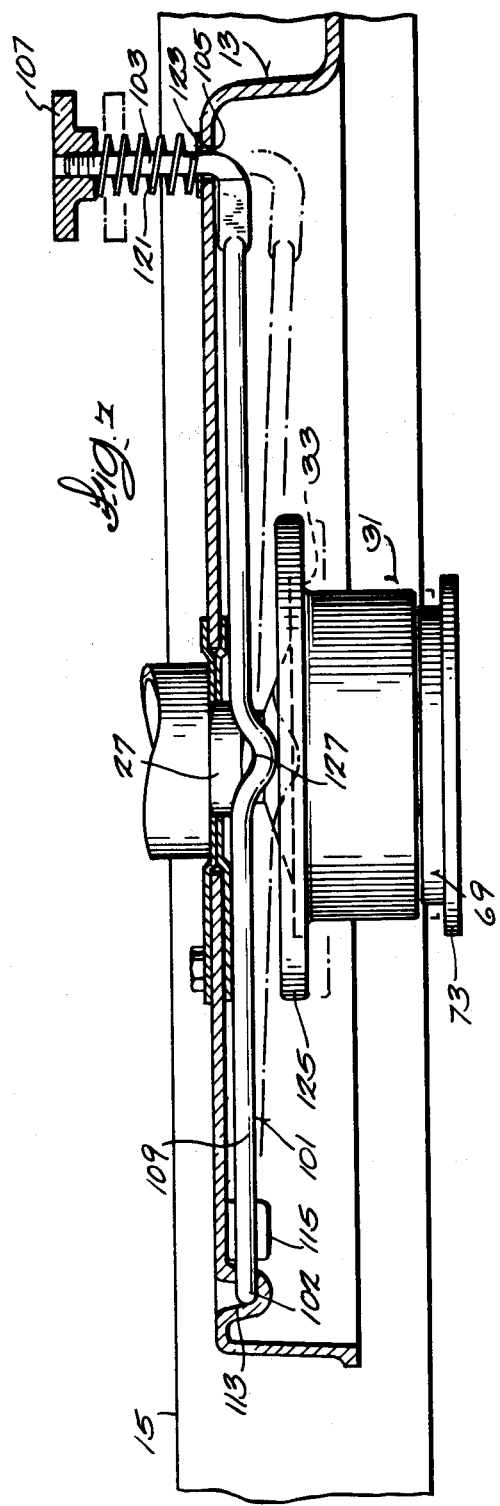

FILAMENT MOWER WITH FILAMENT ADVANCING MECHANISM

BACKGROUND OF THE INVENTION

The invention relates generally to filament mowers, i.e., to mowers which cut grass and vegetation by means of a rotating flexible filament string extending from a filament head. In particular, the invention relates to arrangements in a filament mower for selectively advancing filament string from the head.

Attention is directed to the hand held filament trimmers disclosed in the U.S. Purdue Pat. No. 4,134,204 issued Jan. 16, 1979, and in the Ballas U.S. Pat. Nos. 4,177,561 issued Dec. 19, 1979, 4,162,575 issued July 31, 1979 and 4,172,322 issued Dec. 30, 1979, all of which disclose a filament head which includes an arrangement operable in response to activation from above for selectively advancing filament from the head.

Attention is further directed to the hand held filament trimmer disclosed in the Proulx U.S. Pat. No. 4,097,991 issued July 4, 1978.

Attention is also directed to the filament mower disclosed in the Pittinger U.S. Pat. No. 4,077,191 issued Mar. 7, 1978.

Attention is also directed to the U.S. Pittinger Pat. No. 4,189,830 issued Feb. 26, 1980 which discloses a filament head.

Attention is also directed to one prior commercial hand held "bump head" filament trimmer which included a downwardly open spool cover which was fixed to the handle against axial movement and which was rotatably driven by a prime mover, and a spool which was carried for rotary movement relative to the spool cover and for axial movement relative to the spool cover between upper and lower positions, together with means on the spool and on the spool cover for interengaging the spool cover and the spool for common rotation when the spool was in the upper position and in the lower position and for permitting limited relative rotation between the spool and the spool cover during movement of the spool between the upper and lower positions, and means biasing the spool away from the spool cover and toward the lower position. In operation of this filament trimmer, filament string was played out in response to manual "bumping" of the bottom of the spool against the ground to effect axial movement of the spool relative to the spool cover and thereby to selectively play out the filament string from the filament head.

SUMMARY OF THE INVENTION

The invention provides a filament mower comprising a wheel supported housing having an upper deck, a prime mover mounted on the upper deck and including an output shaft extending through the upper deck into the housing, a string trimmer head fixed to the output shaft within the housing and including a spool carried on the output shaft for rotary movement relative thereto, a spool cover carried on the output shaft for common rotation therewith, one of the spool and the spool cover being movable axially of the output shaft between an upper position and a lower position, means for limiting movement outwardly of the output shaft of the other of the spool and the spool cover, means for biasing the spool and the spool cover away from each other, and means on the spool and on the spool cover for interengaging the spool cover and the spool for common rotation when the one of the spool cover and the spool is in the upper position and in the lower position and for permitting limited relative rotation between the spool and the spool cover during movement of the one of the spool cover and the spool between the upper and lower positions, a lever having an end, means mounting the lever on the housing for pivotal movement between a depressed position engaged with the head so as to displace the one of the spool and the spool cover toward the other against the action of the biasing means, and a raised position out of contact with the head and permitting movement apart of the spool and the spool cover under the influence of the biasing means so as to locate the one of the spool and the spool cover in the upper position, which lever mounting means locates the lever end rearwardly of the head and in position for engagement by the foot of an operator so as to locate the lever in the depressed position, and means biasing the lever to the raised position.

In one embodiment in accordance with the invention, the one of the spool and the spool cover comprises the spool cover and the other of the spool and the spool cover comprises the spool and the spool cover is located above the spool.

In one embodiment in accordance with the invention, the one of the spool and the spool cover comprises the spool and the other of the spool and the spool cover comprises the spool cover and the spool cover is located below the spool.

In one embodiment of the invention, the spool includes a flange, the spool cover includes a skirt, and the interengaging means comprises a series of angularly spaced projections on the flange, a first series of angularly spaced lugs on the spool cover located in the path of rotary movement of the projections when the one of the spool and the spool cover is in one of the upper and lower positions, and a second series of angularly spaced lugs on the skirt located in axial spaced relation from the first series and in the path of rotary movement of the projections when the one of the spool and the spool cover is in the other of the upper and lower positions.

In one embodiment in accordance with the invention, the biasing means comprises a helical spring encircling the output shaft and bearing, at one end, against the spool and, at the other end, against the spool cover.

In one embodiment in accordance with the invention, the mower further includes means for limiting upward movement axially of the output shaft of the one of the spool and the spool cover.

In one embodiment in accordance with the invention, the one of the spool and said spool cover comprises the spool which is located above the spool cover, the head includes a sleeve rotatable on the output shaft and between the output shaft and the spool, and the means for limiting axially upward movement of the spool comprises means on the output shaft limiting axially upwardly movement of the sleeve relative to the output shaft, and interfering shoulder means on the sleeve and on the spool limiting axially upward movement of the spool relative to the sleeve.

In one embodiment in accordance with the invention, the one of the spool and the spool cover comprises the spool cover which is located above the spool, the head includes a driver having a non-circular outer periphery, and means for fixing the driver on the output shaft against axial movement and for common rotary movement with the output shaft, the spool cover includes a central opening matingly receiving the driver outer periphery for relative axial movement therebetween and for common rotary movement of the spool cover and the driver, and the means for limiting axially upward movement of the spool cover comprises interfering shoulder means on the driver and on the spool cover.

In one embodiment of the invention, the housing upper deck includes therein an aperture, the end of the lever is upturned, extends through the aperture, and includes an enlarged head, and the lever biasing means comprises a spring having opposed ends bearing against the housing and the enlarged head.

Other features and advantages of the embodiments of the invention will become known by reference to the following general description, claims and appended drawings.

IN THE DRAWINGS

FIG. 1 is a perspective view of a filament mower embodying various of the features of the invention.

FIG. 2 is an enlarged, partially broken away top view of the filament head included in the filament mower shown in FIG. 1.

FIG. 3 is a fragmentary sectional view taken along line 3—3 of FIG. 2.

FIG. 4 is a view similar to FIG. 3 showing the filament head in another condition.

FIG. 5 is a sectional view similar to FIGS. 3 and 4 showing a modified filament head embodying various of the features of the invention.

FIG. 6 is an enlarged fragmentary view of a portion of the mower shown in FIG. 1.

FIG. 7 is a fragmentary sectional view taken ganerally along line 7—7 of FIG. 6.

Before explaining two embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in FIG. 1 of the drawings is one embodiment of a filament mower 11 which includes a housing 13 including an upper or top deck 15 and a depending peripheral wall 17. The housing 13 is supported for travel over the ground by a plurality of wheels 21. Various housing constructions can be employed. Preferably the housing is constructed as disclosed in our co-pending application Ser. No. 146,258 filed May 5, 1980, which is incorporated herein by reference. The housing 13 is guided for travel over the ground by an upwardly and rearwardly extending handle 25 which can be of any construction, but which is preferably as shown in Application Ser. No. 146,258 filed May 5, 1980.

Mounted on the top deck 15 is a prime mover 23, such as an electric motor or an internal combustion engine, which prime mover 23 includes an output shaft 27 (see FIGS. 3 and 4) which projects downwardly through the top deck 15 to within the housing 13. Carried by the output shaft 27 is a string trimmer head 31 which includes, in part, as shown best in FIGS. 3 and 4 an upper spool cover 33 which is carried by the output shaft 27 for common rotation therewith and for axial movement relative thereto. While various means for mounting the upper spool cover 33 on the output shaft 27 can be employed, in the illustrated construction, such means comprises a driver 35 which has a non-circular periphery 37 and an outwardly projecting upper flange 39.

The driver 37 is secured on the output shaft 27 against axial movement and for common rotary movement by a drive pin 41. In turn, the upper spool cover 33 includes a central hub 43 having a central aperature which matingly receives the non-circular periphery of the driver 37 and wich permits common rotary movement of the driver 37 and the upper spool cover 33, while also affording relative axial movement between the driver 37 and the upper spool cover 33 between an upper spool cover position and a lower spool cover position. The upper position of the upper spool cover 33 is determined by the flange 39 which is provided on the driver 35 and which engages the top of the hub 43 of the upper spool cover 33 to limit upward axial movement thereof. In addition, the upper spool cover 33 includes a flange 45 which extends outwardly from the lower end of the central hub 43 and a peripheral skirt 47 which extends downwardly from the periphery of the flange 45. Still further in addition, a plurality of radially extending and angularly spaced gussets 49 provide reinforcement between the central hub 43 and the outwardly extending flange 45.

Included in the skirt 47 is an aperature 51 through which a filament string 53 extends from the head 31 for cutting of grass, etc.

The head 31 also includes a spool 61 which is mounted on the output shaft 27 below the upper spool cover 33 for rotation relative to the output shaft 27. Means are provided for preventing axially outward movement of the spool 61 from the output shaft 27. While various arrangements can be employed, in the illustrated construction, such means comprises a washer 63 which engages the bottom of the spool 61 and a nut 65 which engages the washer 63 and is threaded into the bottom of the output shaft 27.

While various constructions can be employed, in the illustrated constrution, the spool 61 comprises an upper spool member 67 and a lower member 69. More specifically, the lower spool member 69 includes a central hub part 71 which is rotatably received on the output shaft 27 and a lower outwardly extending flange 73 projecting from the lower end of the hub part 71.

The upper spool member 67 comprises a central hub part 75 which is received on the hub part 71 of the lower spool member 64 and an upper flange 77 which extends from the top end of the hub part 75. Together, the hub parts 71 and 75 of the lower spool member 69 and the upper spool member 67 can be regarded as the hub of the spool 61. In desired, the hub part 71 of the lower spool member 67 could be located telescopically outwardly of the hub part 75 of the upper spool cover 33.

Interengaging means are provided on the upper spool cover 33 and on the spool 61 for selectively engaging the spool 61 with the upper spool cover 33 for common rotation therewith and for disengaging the spool 61 and spool cover 33. While various arrangements can be employed, in the illustrated construction, such means comprises a series of angularly spaced radially outwardly projecting tabs or projections 81 on the periphery of the spool upper flange 77, together with a first or upper series of radially inwardly projecting lugs or tabs 83 extending from the skirt 47 of the upper spool cover 33 in position to interefere with rotation of the tabs or projections 81 on the spool 61 when the upper spool cover 33 is in the lower position, and a second or lower series of radially inwardly projecting angularly spaced lugs or tabs 85 on the skirt 47 in position to interefere with rotation of the projections or tabs 81 on the spool flange 77 when the spool cover 33 is in the upper position.

The first and second series of tabs or lugs 83 and 85 are axially and angularly spaced so that, during movement of the upper spool cover 33 between the upper and lower positions, a limited amount of rotary movement between the spool 61 and the upper spool cover 33 is permitted, which relative movement is effective to play out a limited length of filament string 53 from the spool.

Means are provided for displacing the upper spool cover 33 between its upper and lower positions. While various arrangements can be employed, in the illustrated construction, such displacing means includes means biasing the upper spool cover 33 away from the spool 61 and toward the upper position limited by the upper flange 39 on the driver 35. While various arrangements can be employed, in the illustrated construction, such means comprises a helical spring 91 which, at one end, is seated in an upwardly open annular groove 93 in the hub of the spool 61 and which, at its other end, is seated in an annular recess 95 in the lower surface of the upper spool cover 33.

The upper spool cover displacing means also includes (see FIGS. 6 and 7) an actuating lever 101 which is mounted on the housing 13 for pivotal movement about an axis 102 transverse to the direction of intended mower travel and against rotation about a vertical axis 15, and which extends, from its pivotal mounting, under the top deck and in position for engagement with the upper spool cover 33. The lever 101 is movable between a depressed position engaged with the head 31 so as to displace the spool cover 33 toward the spool 61 against the action of the biasing spring 91, and a raised position out of contact with the head 31 and permitting movement apart of the spool 61 and the spool cover 33 under the influence of the biasing spring 91 so as to locate the spool cover 33 in the upper position.

More specifically, the lever 101 includes an upturned rearward end 103 which projects through an aperture 105 in the top deck 15 of the housing 13. At its outer or upper end, the lever end includes an enlarged head 107 which preferably is threadedly attached, or other suitable structure, and which is located rearwardly of the head 31 in position for engagement by the foot of an operator so as to locate the lever 101 in the depressed position.

While other constructions could be employed, the lever 101 preferably includes two forwardly extending legs 109 which respectively pass to opposite sides of the output shaft 27 and which, at their forward ends, respectively include inwardly bent terminal portions 111 which are received in sockets 113 formed in the housing 13. While various arrangements can be employed to provide the sockets, in the illustrated construction, such pockets 113 are provided by upwardly open bite portions formed in the housing 13.

In order to prevent withdrawal of the inturned terminal portions 111 of the legs 109 from the sockets 113 during lever movement between the raised position closely adjacent to the undersurface of the top deck 15 and the depressed position which is effective to displace the upper spool cover 33 against the action of the spring 91 to its lower position, the housing 13 is provided, for each leg 109, with a pair of downwardly depending projections or lugs 115 which form a notch 117 preventing transverse withdrawal of the leg terminal portions 111 from the sockets 113 during travel of the actuating lever 101 between the raised and depressed positions.

Means are provided for biasing the actuating lever 101 to the raised positions. While various arrangements can be employed, in the illustrated construction, such means comprises a spring 121 which encircles the upturned rearward end 103 of the lever 101 and, which, at one end, bears against the enlarged head 107 and which, at its other end, bears against a washer 123 which encircles the upturned end 103 of the lever 101 and bears against the top deck 15 of the housing 13.

Means are provided for reducing wear and friction incident to operation of the lever 101 to displace the upper spool cover 33 to the lower position. While various arrangements can be employed, in the illustrated construction, the upper surface of the upper spool cover 33 can be provided with an annular wear plate or washer 125, preferably of metal. In addition, each of the lever legs 109 includes a rounded lug or projection 127 which is located for sliding engagement with the wear washer 125 when the lever 101 is depressed so as thereby to depress the upper spool cover 33 to the lower position against the action of the helical spring 91. When the lever 101 is released from its lower position, the spring 121 biases the lever 101 upwardly to the raised position, preferably out of contact with the wear washer 125 and the spring 91 biases the upper spool cover 33 to the upper position. When the lever 101 is in the raised position and the upper spool cover 33 is in the upper position, the lugs 127 are preferably spaced from or out of contact with the wear plate 125.

In operation, during movement of the upper spool member 33 relative to the upper and lower positions, the spool 61 is permitted to rotate relative to the upper spool cover 33 and play out a limited amount of filament string 53. Such playing out is accomplished by stepping on the head 107 of the actuating lever 101 to depress the lever 101 and then by releasing the lever 101.

Shown in FIG. 5 is another embodiment of a filament head 151 which includes various features of the invention and which is adopted to be employed in the mower 11 shown in FIG. 1. More specifically, the filament head 151 includes a spool 153 which is mounted on the output shaft 27 for relative rotation therebetween, as well as for axially movement between upper and lower positions, together with a lower spool cover 155 which is fixed to the input shaft 27 for common rotation therewith and against axially outward or downward movement relative to or from the output shaft 27. While various arrangements can be employed, in the illustrated construction, such means comprises a threaded lower end portion on the output shaft 27, and application thereto of a nut 157 which bears against the lower spool cover 155 to prevent axially outward movement thereof and which is received in a downwardly open recess 159 which is formed in a central hub 161 of the lower spool cover 155 and which has a non-circular configuration corresponding to that of the nut 157, thereby providing for common rotation of the lower spool cover 155 with the output shaft 27.

The lower spool cover 155 includes an outwardly extending flange 163 and a skirt 165 which extends upwardly from the perimeter of the flange 163 and which includes one or more apertures 167 through which filament string 53 extends from the spool 153. The lower spool cover 155 can also include a series of angularly spaced, reinforcing gussets 169 extending between the flange 163 and the hub 151.

The spool 153 includes a lower flange 171 which extends from a central hub 173 which is rotatably mounted on a bearing portion of an axially movable member or sleeve 175 located on the output shaft 27 for both rotary movement and axial movement relative thereto. The spool 153 also includes an upper flange 177 having a short downwardly extending skirt 179 telescopically receivable inwardly of the skirt 165 of the lower spool cover 155.

The axially movable member or sleeve 175 includes an enlarged head 181 having a lower shoulder 183 which engages the upper surface of the upper spool flange 177, which includes a central recess 185, and an upper outwardly extending flange 187.

Means are provided for limiting upward movement of the axially movable member or sleeve 175 on the output shaft 27. While various arrangements could be employed, in the illustrated construction, such means comprises a retainer ring 191 located in an annular groove 193 in the output shaft 27 and bearing against the bottom of the recess 185 when the axially movable member or sleeve 175 is in the uppermost position.

Means are provided for displacing the spool 153 relative to the lower spool cover 155. While various arrangements can be employed, such means comprises means for biasing apart the spool 153 and lower spool cover 155. While various arrangements can be employed, in the illustrated construction, such means comprises a helical spring 195 which, at one end, is seated in a downwardly open annular groove 197 in the hub of the spool 153 and which, at its other end, engages against an upwardly facing surfacing 198 on the lower spool cover 155.

Means are also provided for displacing the spool 153 downwardly against the action of the spring 195 and toward the lower spool cover 155. While various arrangements can be employed, in the illustrated construction, such means comprises an actuating lever 201 which is mounted on the housing 13 in a manner similar to that described in FIGS. 6 and 7 and which includes, between a pair of spaced legs 203, a plate 205 which includes an aperture 207 through which the output shaft 27 entends and which includes an annular portion 209 which is engageable against the axially movable member or sleeve 175 so as to engage the member or sleeve 175 and move the member or sleeve 175 downwardly in response to depression of the lever 201 from a biased raised position to a depressed position, all as generally disclosed with respect to FIGS. 6 and 7.

As in the embodiment shown in FIGS. 2, 3 and 4, the head 151 also includes a series of angularly spaced lugs or projections 211 on the lower flange 171 of the spool 153 and first and second axially spaced series of angularly spaced tabs or lugs 213 and 215 on the skirt 165 of the lower spool cover 155, which projections or tabs 213 and 215 on the lower spool cover 155 are located to interfere with the projections or lugs 211 on the lower flange 171 of the spool 153 when the spool 153 is in the upper and lower positions and to permit relative movement between the spool 153 and the lower spool cover 155 during movement of the spool 153 between the upper and lower positions.

The filament head 151 shown in FIG. 5 operates in generally the same manner as the filament head 31 shown in FIGS. 2, 3 and 4 except that the provision of the axially and rotatably movable member or sleeve 175 on the output shaft 27 minimizes relative motion between the outwardly extending flange 187 of the sleeve 175 and the plate 205 of the actuating lever 201. As in the embodiment shown in FIGS. 2, 3 and 4 downward depression of the actuating lever 201 serves to displace the spool 153 downwardly relative to the spool cover 155 and thereby to permit playing out of a limited length of filament string 53. Release of the actuating lever 201 from its depressed condition also permits upward spool movement under the influence of the spring 195, thereby also playing out a limited length of filament string 53.

Various of the features of the invention are set forth in the following claims.

We claim:

1. A filament mower comprising a wheel supported housing having an upper deck, a prime mover mounted on said upper deck and including an output shaft extending through said upper deck into said housing, a string trimmer head fixed to said output shaft within said housing and including a spool carried on said output shaft for rotary movement relative thereto, a spool cover carried on said output shaft for common rotation therewith, one of said spool and said spool cover being movable axially of said output shaft between an upper position and a lower position, means for limiting movement outwardly of said output shaft of the other of said spool and said spool cover, means for biasing said spool and said spool cover away from each other and means on said spool and on said spool cover for interengaging said spool cover and said spool for common rotation when said one of said spool and said spool cover is in the upper position and in the lower position and for permitting limited relative rotation between said spool and said spool cover during movement of said one of said spool and said spool cover between said upper and lower positions, a lever having an end, means mounting said lever on said housing for pivotal movement between a depressed position engaged with said head so as to displace said one of said spool and said spool cover toward the other against the action of said biasing means, and a raised position out of contact with said head and permitting movement apart of said spool and said spool cover under the influence of said biasing means so as to locate said one of said spool and said spool cover in the upper position, said lever mounting means locating said end rearwardly of said head and in position for engagement by the foot of an operator so as to locate said lever in the depressed position, and means biasing said lever to the raised position.

2. A filament mower in accordance with claim 1 wherein said spool includes a flange, wherein said spool cover includes a skirt, and wherein said interengaging means comprises a series of angularly spaced projections on said flange, a first series of angularly spaced lugs on said spool cover located in the path of rotary movement of said projections when said one of said spool and said spool cover is in one of the upper and lower positions, and a second series of angularly spaced lugs on said skirt located in axial spaced relation from said first series and in the path of rotary movement of said projections when said one of said spool and said spool cover is in the other of the upper and lower positions.

3. A filament mower in accordance with claim 1 wherein said one of said spool and said spool cover comprises said spool cover and said other of said spool and said spool cover comprises said spool.

4. A filament mower in accordance with claim 3 wherein said spool cover is located above said spool.

5. A filament mower in accordance with claim 1 wherein said one of said spool and said spool cover comprises said spool and said other of said spool and said spool cover comprises said spool cover.

6. A filament mower in accordance with claim 5 wherein said spool cover is located below said spool.

7. A filament mower in accordance with claim 1 and further including means for limiting upward movement axially of said output shaft of said one of said spool and said spool cover.

8. A filament mower in accordance with claim 7 wherein said one of said spool and said spool cover comprises said spool which is located above said spool cover, wherein said head includes a sleeve rotatable on said output shaft and between said output shaft and said spool, and wherein said means for limiting axially upward movement of said spool comprises means on said output shaft limiting axially upward movement of said sleeve relative to said output shaft, and interfering shoulder means on said sleeve and on said spool limiting axially upwardly movement of said spool relative to said sleeve.

9. A filament mower in accordance with claim 7 wherein said one of said spool and said spool cover comprises said spool cover which is located above said spool, wherein said head includes a driver having a non-circular outer periphery, and means for fixing said driver on said output shaft against axial movement and for common rotary movement with said output shaft, wherein said spool cover includes a central opening matingly receiving said driver outer periphery for relative axial movement therebetween and for common rotary movement of said spool cover and said driver, and wherein said means for limiting axially upward movement of said spool cover comprises interfering shoulder means on said driver and on said spool cover.

10. A filament mower in accordance with claim 1 wherein said biasing means comprises a helical spring encircling said output shaft and bearing, at one end, against said spool and, at the other end, against said spool cover.

11. A filament mower in accordance with claim 1 wherein said means mounting said lever on said housing prevents rotation of said lever about a vertical axis and affords pivotal movement of said lever about an axis transverse to the direction of intended mower movement between the depressed position and the raised position.

12. A filament mower in accordance with claim 1 wherein said housing upper deck has an aperture therein, and wherein said lever end is upturned and extends through said housing aperture.

13. A filament mower in accordance with claim 12 wherein said upturned end of said lever includes an enlarged head and wherein said lever biasing means comprises a spring having opposed ends bearing against said housing and said enlarged head.

14. A filament mower in accordance with claim 12 wherein said lever includes two spaced legs which extend forwardly from said upturned end and which are respectively located on opposite sides of said output shaft.

15. A filament mower in accordance with claim 14 wherein each of said legs includes a forwardly located inwardly bent end, and wherein said lever mounting means comprises, for each leg, formation of said housing with a depending bite adapted to receive said inturned end, and wherein said housing includes, for each of said legs, a pair of spaced lugs which form a downwardly open notch and which receive therebetween an intermediate portion of said leg to prevent withdrawal of said inturned end from said bite in response to movement of said lever between the raised and depressed positions.

16. A filament mower in accordance with claim 1 wherein said one of said spool and said spool cover comprises said spool which is located above said spool cover, and wherein said head includes a sleeve rotatable on said output shaft between said output shaft and said spool, and wherein said lever includes a plate engageable with said sleeve so as to axially downwardly displace said sleeve and said spool to said lower position and against the action of said biasing means in response to movement of said lever to said depressed position.

17. A filament mower in accordance with claim 1 wherein said one of said spool and said spool cover comprises said spool cover which is located above said spool, and wherein said head includes a plate fixed to said spool cover, and wherein said lever includes a protuberance slidably engageable with said plate so as to displace said spool cover to said lower position and against the action of said biasing means in response to movement of said lever to said depressed position.

* * * * *